United States Patent
Viswanathan et al.

(10) Patent No.: US 10,671,219 B2
(45) Date of Patent: Jun. 2, 2020

(54) SCANNING TIME OF FLIGHT 3D SENSING WITH SMART PULSING

(71) Applicant: Microvision, Inc., Redmond, WA (US)

(72) Inventors: P. Selvan Viswanathan, Bellevue, WA (US); Jari Honkanen, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 175 days.

(21) Appl. No.: 15/894,668

(22) Filed: Feb. 12, 2018

(65) Prior Publication Data
US 2019/0250768 A1    Aug. 15, 2019

(51) Int. Cl.
| | | |
|---|---|---|
| G06F 3/042 | (2006.01) | |
| G06F 3/041 | (2006.01) | |
| G06F 3/0488 | (2013.01) | |
| G06F 3/01 | (2006.01) | |

(52) U.S. Cl.
CPC ............ *G06F 3/0423* (2013.01); *G06F 3/017* (2013.01); *G06F 3/0416* (2013.01); *G06F 3/0421* (2013.01); *G06F 3/04883* (2013.01); *G06F 3/041661* (2019.05)

(58) Field of Classification Search
CPC ... G06F 3/0421; G06F 3/04883; G06F 3/0416
See application file for complete search history.

(56) References Cited

U.S. PATENT DOCUMENTS

| | | | |
|---|---|---|---|
| 9,392,259 B2 | 7/2016 | Borowski | |
| 2011/0254864 A1 | 10/2011 | Tsuchikawa | |
| 2013/0162598 A1* | 6/2013 | Lin | H04N 9/3129 345/175 |
| 2013/0207970 A1 | 8/2013 | Shpunt et al. | |
| 2014/0085610 A1 | 3/2014 | Viswanathan | |
| 2016/0080709 A1* | 3/2016 | Viswanathan | H04N 9/3155 353/85 |
| 2017/0052632 A1 | 2/2017 | Kamamori | |
| 2017/0068393 A1 | 3/2017 | Viswanathan | |
| 2018/0124468 A1* | 5/2018 | Hollingum | G06F 3/04855 |
| 2019/0132537 A1* | 5/2019 | Webster | H04N 5/378 |
| 2019/0204423 A1* | 7/2019 | O'Keeffe | G01S 7/4817 |

FOREIGN PATENT DOCUMENTS

| | | |
|---|---|---|
| EP | 2504718 | 9/2017 |
| JP | 2004298285 | 10/2004 |
| JP | 5978565 | 8/2016 |

OTHER PUBLICATIONS

Microvision, Inc., , "International Search Report and Written Opinion", dated Apr. 29, 2019.

* cited by examiner

*Primary Examiner* — Amr A Awad
*Assistant Examiner* — Maheen I Javed
(74) *Attorney, Agent, or Firm* — Kevin D. Wills

(57) ABSTRACT

A scanning display system includes smart infrared pulsing to detect gestures and touch events with reduced power consumption. Infrared laser light pulses are emitted at a first density in a field of view and reflections are detected. Times of flight of the infrared laser light pulses are measured to determine if an object is in the field of view. The density of the infrared pulses may be increased based on various factors to detect gestures and touch events. Power consumption is reduced by reducing the density of laser pulses when possible.

19 Claims, 14 Drawing Sheets

SCANNING TIME OF FLIGHT 3D SENSING WITH SMART PULSING

FIELD

The present invention relates generally to scanned beam display systems, and more specifically to data acquisition in scanned beam display systems.

BACKGROUND

Interactive scanned beam display systems typically acquire data that relates to the position or movement of pointing objects in the field of view of the display. The data relating to the pointing objects is then mapped to events that can be consumed by a processing device. For example, pointing object data may be mapped to gestures, touch events, mouse clicks, or the like.

Increased resolution, accuracy, and range can be achieved by increasing power output and/or receive gain, both of which result in increased power consumption, and/or opto-mechanical design complexity, which may not be desirable.

DESCRIPTION OF EMBODIMENTS

Figure 1:
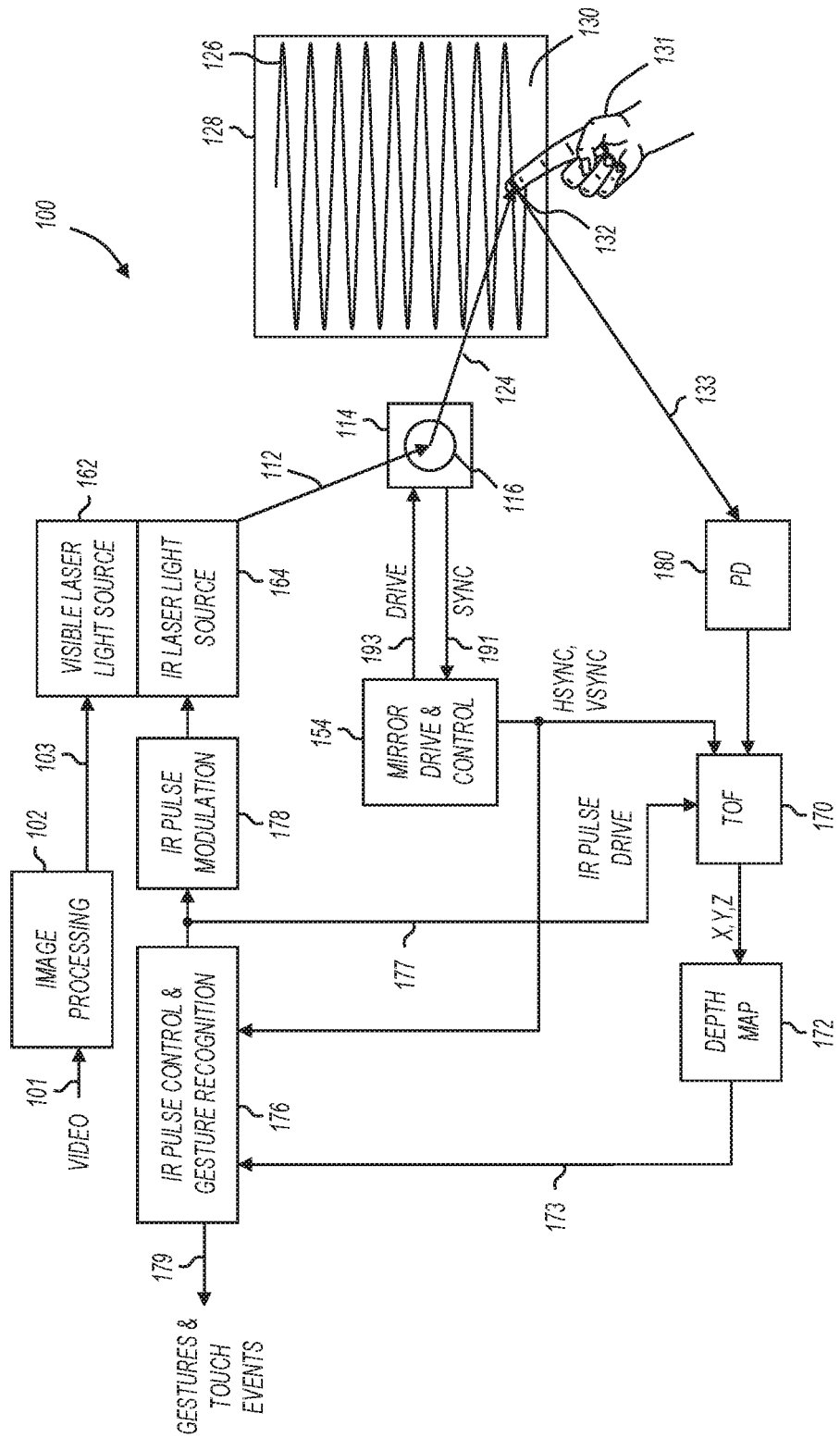
FIG. 1 shows a scanned beam 3D sensing system with smart pulsing in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanned beam 3D sensing system with smart pulsing in accordance with various embodiments of the present invention. System 100 includes image processing component 102, light sources 162 and 164, scanning platform 114 with scanning mirror 116, and mirror drive and control circuit 154. System 100 also includes photodetector (PD) 180, time-of-flight (TOF) detection circuit 170, depth map storage 172, infrared (IR) pulse control and gesture recognition circuit 176, and IR pulse modulation circuit 178.

Photodetector 180 may be implemented using any suitable light detecting device. For example, in some embodiments PD 180 may be implemented by a PIN photodiode, a Silicon photomultiplier (SiPM), or an avalanche photodiode (APD).

Light sources 162 and 164 may be laser light sources such as laser diodes or the like, capable of emitting a laser beam 112. The beam 112 impinges on a scanning platform 114 which is part of a microelectromechanical system (MEMS) based scanner or the like, and reflects off of scanning mirror 116 to generate a controlled output beam 124. A scanning mirror drive and control circuit 154 provides one or more drive signal(s) 193 to control the angular motion of scanning mirror 116 to cause output beam 124 to generate a raster scan 126 on a projection surface 128. In operation, light sources 162 and/or 164 produce light pulses and scanning mirror 116 reflects the light pulses as beam 124 traverses raster scan 126.

In some embodiments, raster scan 126 is formed by combining a sinusoidal component on the horizontal axis and a sawtooth component on the vertical axis. In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the sinusoidal pattern as the beam sweeps vertically top-to-bottom, but does not show the flyback from bottom-to-top.

In other embodiments, the vertical sweep is controlled with a triangular wave such that there is no flyback. In still further embodiments, the vertical sweep is sinusoidal. The various embodiments of the present invention are not limited by the waveforms used to control the vertical and horizontal sweep or the resulting raster pattern.

Although scanning mirror 116 is shown as a single mirror that scans in two dimensions, this is not a limitation of the present invention. For example, in some embodiments, mirror 116 is replaced by two mirrors, one scanning in one dimension, and a second scanning in a second dimension.

In operation, mirror drive and control circuit 154 provides drive signal(s) 193 to control the angular motion of scanning mirror 116. In some embodiments, scanning mirror 116 includes one or more sensors to detect the angular position or angular extents of the mirror deflection (in one or both dimensions), and this information is provided back to mirror drive and control circuit 154 as one or more sync signals 191. In these embodiments, mirror drive and control circuit 154 includes a feedback loop to modify the drive signals in response to the measured angular deflection of the mirror.

Mirror drive and control circuit 154 is implemented using functional circuits such as phase lock loops (PLLs), filters, adders, multipliers, registers, processors, memory, and the like. Accordingly, mirror drive and control circuit 154 may be implemented in hardware, software, or in any combination. For example, in some embodiments, control circuit 154 is implemented in an application specific integrated circuit (ASIC). Further, in some embodiments, some of the faster data path control is performed in an ASIC and overall control is software programmable.

In some embodiments, light source 162 sources visible light. For example, light source 162 may include sources of red, green, and blue laser light. In these embodiments, visible light sources 162 are modulated to produce color pixels that are used to create an image as output beam 124 traverses raster scan 126.

Image processing component 102 receives video data on node 101 and produces pixel data on node 103 used to drive light source(s) 162 when pixels are to be displayed. The video data on node 101 represents image source data that is typically received with pixel data on a rectilinear grid, but this is not essential. For example, video data on node 101 may represent a grid of pixels at any resolution (e.g., 640×480, 848×480, 1920×1080). Raster scan 126 does not necessarily align with the rectilinear grid in the image source data, and image processing component 102 operates to produce display pixel data that will be displayed at appropriate points on the raster pattern. For example, in some embodiments, image processing component 102 interpolates vertically and/or horizontally between pixels in the source image data to determine display pixel values along the scan trajectory of the raster pattern.

Embodiments that include image processing component 102 and visible laser light sources 162 are referred to herein as including an embedded projector. Embodiments that exclude image processing component 102 and visible laser light sources 162 are referred to as scanned beam 3D sensing systems without embedded projection capabilities.

In some embodiments, light source 164 sources nonvisible light such as infrared (IR) light. In these embodiments, PD 180 is able to detect the same wavelength of nonvisible light. For example, in some embodiments, light source 164 may be an infrared laser diode that produces light with a wavelength of substantially 808 nanometers (nm). The wavelength of light is not a limitation of the present invention. Any wavelength, visible or nonvisible, may be used without departing from the scope of the present invention.

Time-of-flight (TOF) detection circuit 170 receives IR pulse timing information (IR pulse drive) from IR pulse control and gesture recognition circuit 176 and compares it to the timing of a received IR pulse to determine the TOF of an IR pulse, thereby measuring the distance to the either the projection surface or an object in the field of view, such as object 131.

Depth map storage 172 receives three dimensional (3D) data from TOF detection circuit 170 for various reflection points in the field of view and stores this data as a depth map. Depth map data is provided as a series of three-tuples (x,y,z) describing the location of reflection point in the field of view to IR pulse control and gesture recognition circuit 176 at 173.

Depth map storage 172 may be implemented using any suitable circuit structure. For example, in some embodiments, depth map storage 172 is implemented in a dual port memory device that can be written on one port and read on a second port. In other embodiments, depth map storage 172 is implemented as data structures in a general purpose memory device. In still further embodiments, depth map storage 172 is implemented in an application specific integrated circuit (ASIC).

The rate at which IR pulses are created, reflected, and processed in the receive signal path may determine the spatial measurement resolution on raster pattern 126, but may also affect total power consumption. For example, if pulses are created far apart in time, then measured points on raster pattern 126 may be further apart, thereby decreasing spatial resolution. Also for example, if pulses are created closer in time, then the spatial resolution can increase at the expense of increased power.

System 100 is referred to as including smart pulsing in part because it can modify the density of projected infrared pulses in response to various criteria, resulting in reduced power when lower spatial resolution is acceptable, and resulting in higher spatial resolution when desired, albeit at the expense of increased power. For example, determining if an object is in the field of view may be performed with low density and low power, detecting gestures may be performed with medium density and medium power, and detecting touch events may be performed with high density and high power. The terms low, medium, and high are used as relative terms, and not meant to imply any particular level of pulse density or power consumption.

IR pulse control and gesture recognition circuit 170 controls the generation and density of IR pulses and detects gestures and touch events as appropriate. For example, in some embodiments, IR pulse control and gesture recognition circuit 170 may cause system 100 to first emit infrared laser light pulses at a first density to determine if an object is in the field of view. System 100 may then at any time and based on any criteria, including acquired or generated data, increase the density of emitted infrared pulses in stages to accomplish various purposes. For example, in some embodiments, system 100 may operate in a first mode with a first IR pulse density to detect objects, transition to a second mode with a second IR pulse density higher than the first density to detect gestures, and then transition to a third mode with a third IR pulse density higher than the second density to detect touch events. Transitions between the different modes may be in response to movement of the object in field of view, times spent in each of the modes, or the like. These and other embodiments of smart pulsing are described further below.

Figure 2:
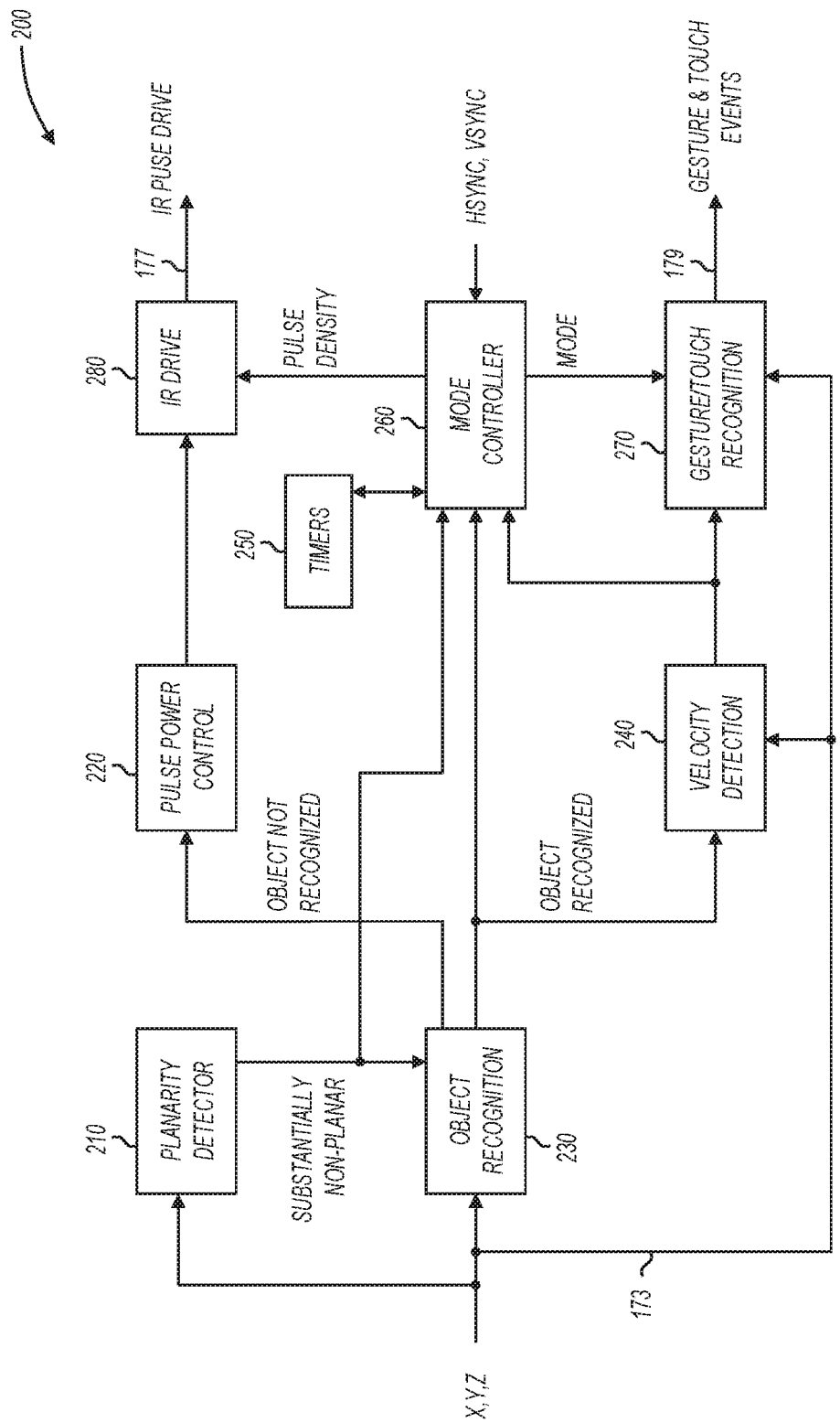
FIG. 2 shows an infrared pulse control and gesture recognition control circuit in accordance with various embodiments of the present invention.

FIG. 2 shows an infrared pulse control and gesture recognition control circuit in accordance with various embodiments of the present invention. IR pulse control and gesture recognition control circuit 200 is an example embodiment of control circuit 176 (FIG. 1).

IR pulse control and gesture recognition control circuit 200 includes planarity detector 210, object recognition circuit 230, velocity detection circuit 240, timers 250, mode controller 260, and gesture and touch recognition circuit 270. IR pulse control and gesture recognition control circuit 200 also includes pulse power control circuit 220 and IR drive circuit 280.

In operation, planarity detector 210 receives the depth map information describing the location of reflection points within the field of view on node 173. Planarity detector 210 determines if the reflection points lie in substantially the same plane or if they are substantially non-planar. As used herein, the term "substantially non-planar" describes a situation in which one or more of the reflection points is far enough outside a plane formed by the remaining reflection points that an inference of an object in the field of view is proper. For example, the reflection points may be found to be substantially non-planar only when one or more reflection points lie outside a best fit plane by a particular margin.

In some embodiments, planarity detector 210 is implemented with digital hardware that determines a best fit plane and compares each reflection point to the best fit plane. In these embodiments, planarity detector 210 may include adders, multipliers, comparators, registers, and the like. In other embodiments, planarity detector 210 is implemented by a processor that executes instructions stored in a non-transitory memory device. These and other embodiments are described further below.

When planarity detector 210 determines that the reflection points are substantially non-planar, this information is provided to mode controller 260 and object recognition circuit 230. Object recognition circuit 230 also receives the reflection points and responds to the indication of substantial non-planarity by attempting to recognize an object in the field of view that caused the non-planarity. For example, in interactive display embodiments, object recognition circuit 230 may determine whether a human hand is recognized. In other embodiments, object recognition circuit 230 may attempt to recognize different objects. For example, object recognition circuit 230 may attempt to recognize a car, a building, or the like.

In some embodiments, object recognition circuit 230 is implemented with digital hardware that compares the reflection points with known images of human hands (or other objects) at a very high speed. In these embodiments, object recognition circuit 230 may include adders, multipliers, comparators, registers, and the like. In other embodiments, object recognition circuit 230 is implemented by a processor that executes instructions stored in a non-transitory memory device. These and other embodiments are described further below.

When the reflection points are substantially non-planar and an object is not recognized, pulse power control circuit 220 may take an action to reduce laser pulse power to a safe level. For example, in tabletop interactive display embodiments, if an object is detected but not recognized as a human hand, then this may be considered a safety violation based on the assumption that the object may be harmed by high laser pulse power levels. Accordingly, the power may be reduced to a safe level in response the safety violation. In some embodiments, the safe level may be a very low power, and in other embodiments, the safe level may be zero power.

Although pulse power control circuit 220 is shown in FIG. 2 as only controlling power of infrared laser light pulses, in some embodiments, pulse power control circuit 220 also controls the power of visible laser light pulses.

Pulse power control circuit 220 may be implemented with any suitable circuit structures. For example, pulse power control circuit 220 may be implemented with amplifiers, voltage references, digital to analog converters, and the like. Pulse power control circuit 220 is not limited by the implementing circuit structures.

Velocity detection circuit 240 detects the velocity of one or more points on an object that has been recognized. For example, if a human hand has been recognized, velocity detection circuit 240 may detect the velocity of a fingertip, multiple fingertips, or the centroid of the hand. In some embodiments, velocity detection circuit 240 provides velocity information to mode controller 260, which may then be used to transition between operating modes. Further, in some embodiments, velocity detection circuit 240 provides velocity information to gesture and touch recognition circuit 270, which may then be used for gesture detection.

In some embodiments, velocity detection circuit 240 is implemented with digital hardware that determines the velocity of x,y points on an object in the field of view. In these embodiments, velocity detection circuit 240 may include adders, multipliers, comparators, registers, and the like. In other embodiments, velocity detection circuit 240 is implemented by a processor that executes instructions stored in a non-transitory memory device. These and other embodiments are described further below.

Gesture and touch recognition circuit 270 detects gestures and/or touch events based in part on the operating mode provided by mode controller 260, the velocity information provided by velocity detection circuit 240, and the reflection points provided on node 173. For example, if the operating mode is one in which gestures are to be recognized, gesture and touch recognition circuit 270 may use velocity information to detect gestures made by the object in the field of view. Also for example, if the operating mode is one in which touch events are to be recognized, gesture and recognition circuit 270 may use the reflection points to determine the distance between a fingertip and a projection surface to detect a touch event.

In some embodiments, gesture and touch recognition circuit 270 is implemented with digital hardware that compares velocity profiles with known gesture profiles to detect gestures and/or compares distances to different reflection points to detect touch events. In these embodiments, gesture and touch recognition circuit 270 may include adders, multipliers, comparators, registers, and the like. In other embodiments, gesture and touch recognition circuit 270 is implemented by a processor that executes instructions stored in a non-transitory memory device. These and other embodiments are described further below.

Mode controller 260 sets a mode that controls the pulse density as well as gesture recognition and/or touch event recognition. Mode controller 260 may control any number of modes corresponding to any number of IR pulse densities. As an example, three modes are now described corresponding to low density, medium density, and high density, where low density is used for non-planarity detection, medium density is used for gesture recognition, and high density is used for touch event recognition.

Figure 3:
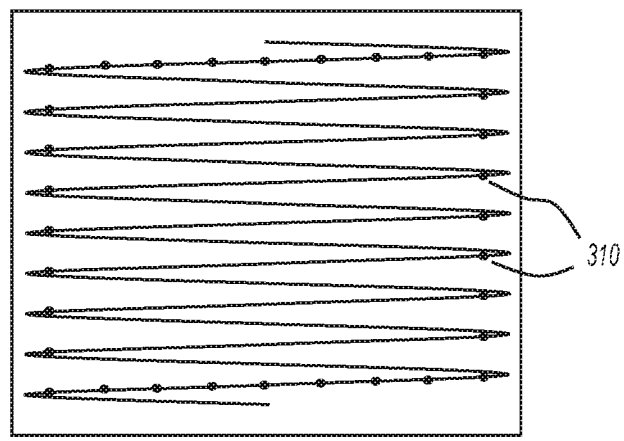
FIG. 3 shows infrared laser light pulses at a first density in accordance with various embodiments of the present invention.

Mode controller 260 begins operation in a low density mode. During operation in the low density mode, IR pulses are emitted at a low density, also referred to as a first density. An example of a low density mode is shown in FIG. 3 where the low density pulses 310 are arranged in a perimeter of the field of view. In some projector embodiments, the low density pulses are outside an active video region, and in other embodiments, the low density pulses are within an active video region. In still further embodiments, the low density pulses are emitted during flyback (not shown). Low density IR pulses may be arranged in any fashion, including as a series of lines, in a rectilinear grid, or the like. Operation in a low density mode allows a coarse resolution of reflection points while reducing power consumption as compared to higher density modes.

Figure 4:
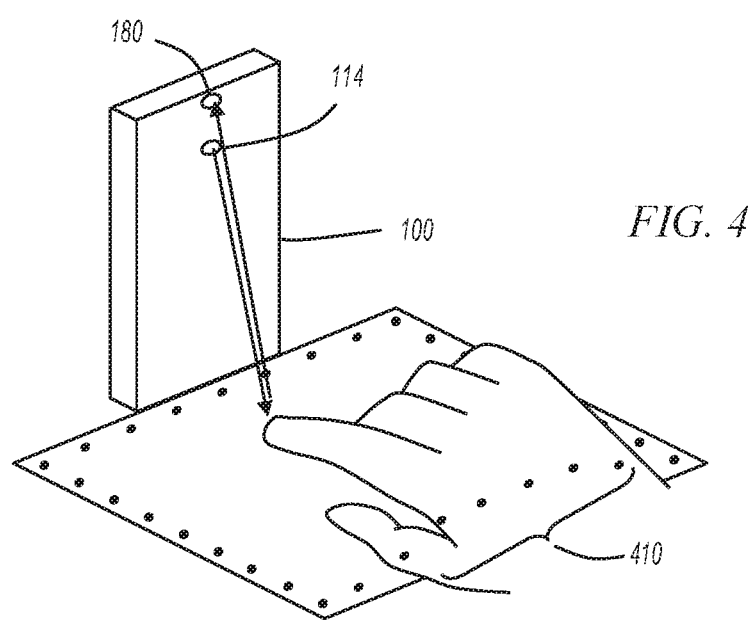
FIG. 4 shows infrared laser light pulses at a first density used to detect an object in a field of view in accordance with various embodiments of the present invention.

In some embodiments, mode controller 260 continues to operate in the low density mode until a non-planarity is detected. For example, as shown in FIG. 4, an object (human hand) has entered the field of view causing the reflection points to be non-planar. Specifically, the reflection points corresponding to IR pulses 410 deviate from a best fit plane formed by the remaining reflection points.

Figure 5:
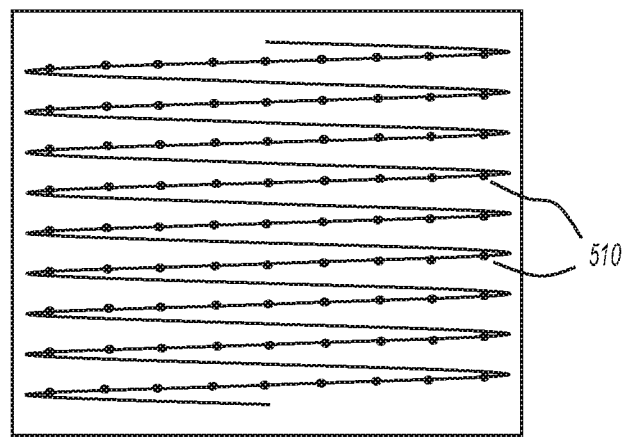
FIG. 5 shows infrared laser light pulses at a second density in accordance with various embodiments of the present invention.

In response to the object entering the field of view, planarity detector 210 determines that the reflection points are substantially non-planar, and mode controller 260 switches to a medium density mode. During operation in the medium density mode, IR pulses are emitted at a second density, which is higher than the first density. An example of a medium density mode is shown in FIG. 5 where the medium density pulses 510 are arranged in a regular grid in the field of view.

Figure 6:
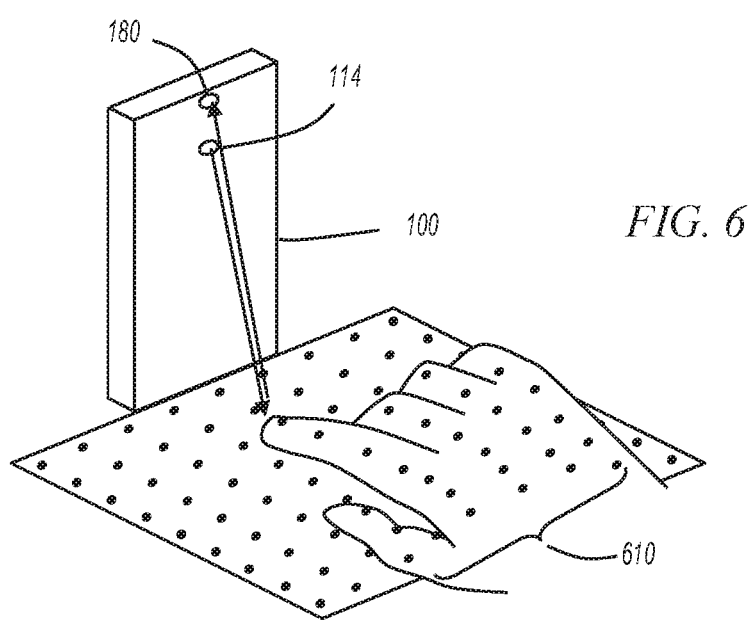
FIG. 6 shows infrared laser light pulses at a second density used to detect gestures made by an object in a field of view in accordance with various embodiments of the present invention.

While operating in the medium density mode, object recognition circuit 230 attempts to recognize the object that caused the substantial non-planarity in the field of view. In some embodiments, if the object is not recognized, pulse power control circuit 220 reduces power to a safe level as described above. In the example of FIG. 6, the object is recognized as a human hand, and this information is provided to velocity detection circuit 240 and mode controller 260.

Figure 9:
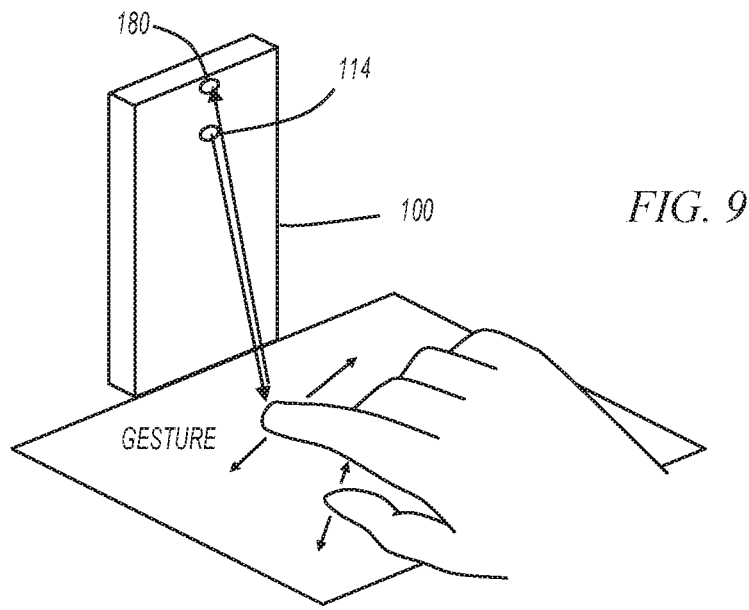
FIG. 9 shows the detection of gestures made by an object in a field of view in accordance with various embodiments of the present invention.

When the object is recognized while operating in the medium density mode, mode controller 260 provides mode information to gesture and touch recognition circuit 270. In response, gesture and touch recognition circuit 270 attempts to recognize gestures made by the recognized object. In some embodiments, the velocity of a single x,y point on the object is compared to known velocity profiles that represent gestures. The single x,y point may represent a fingertip, a centroid of the hand, or the like. In other embodiments, the velocity of multiple x,y points on the object are compared to known velocity profiles that represent gestures. For example, multiple fingertips may be monitored for gestures. FIG. 9 shows the detected velocity of two fingertips during the recognition of a gesture while in medium density mode.

Operation in medium density mode provides increased resolution over low density mode at the expense of increased power, however the power consumption is still lower than the high density mode.

Based on one or more criteria, mode controller 260 switches from medium density mode to high density mode. For example, in some embodiments, if the velocity detected by velocity detection circuit 240 drops below a threshold, mode controller 260 may switch from medium density mode to high density mode. In other embodiments, mode controller 260 starts a timer 250 when entering medium density mode, and if the timer times out and the object is still recognized, mode controller 260 switches from medium density mode to high density mode. Any criteria, including any combination of velocity information and timer information, may be used to make the decision to transition between modes.

Figure 7:
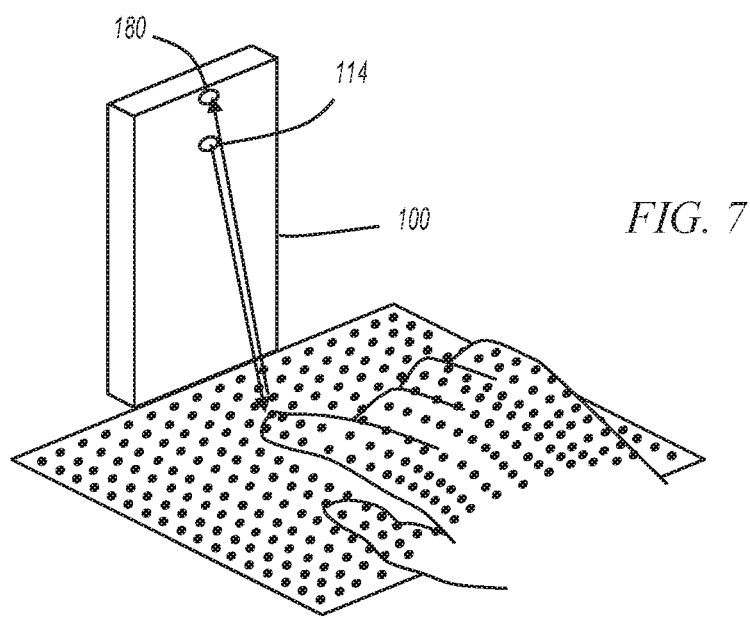
FIGS. 7 and 8 show infrared laser light pulses at a third density used to detect touch events made by an object in a field of view in accordance with various embodiments of the present invention.
Figure 8:
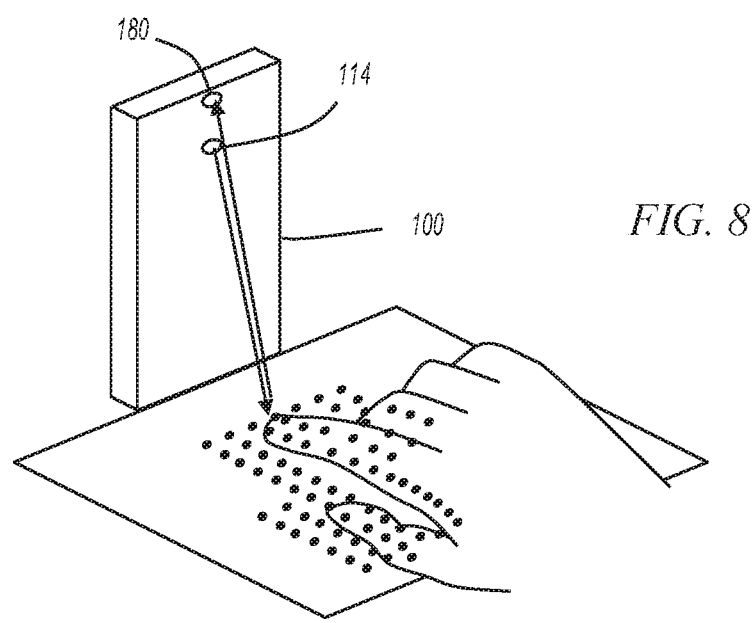

During operation in the high density mode, IR pulses are emitted at a third density, which is higher than the second density. Examples of high density modes are shown in FIGS. 7 and 8. In the example of FIG. 7, the high density pulses are arranged in a regular grid over the entire field of view, and in the example of FIG. 8, the high density pulses are arranged to cover x,y points of interest in a subset of the field of view. For example, the high density pulses in FIG. 8 cover a fingertip and the tip of the thumb.

Figure 10:
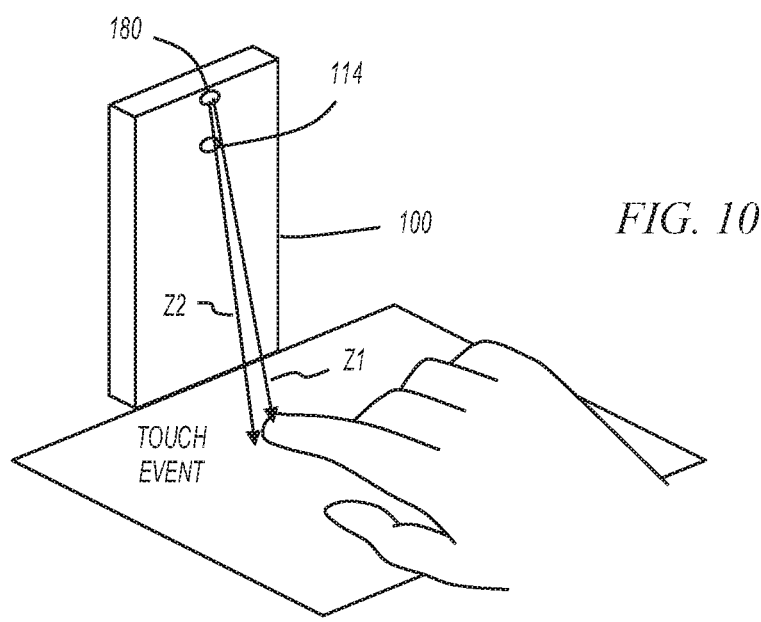
FIG. 10 shows the detection of touch events made by an object in a field of view in accordance with various embodiments of the present invention.

When the object continues to be recognized while operating in the high density mode, mode controller 260 provides mode information to gesture and touch recognition circuit 270. In response, gesture and touch recognition circuit 270 attempts to recognize touch events made by the recognized object. In some embodiments, the distance to a x,y point on the object is compared to a distance to a projection surface near the x,y point. When the difference between the distances is below a threshold, a touch event is recognized. For example, if the difference between distances Z1 and Z2 in FIG. 10 is less than a threshold value, then a touch event may be recognized while in high density mode.

Operation in high density mode provides increased resolution over both low and medium density modes at the expense of increased power. To save power, mode controller 260 may transition out of high density mode based on any criteria. For example, in some embodiments, if the object is still recognized and the velocity increases above a threshold, the mode may switch from high density mode to medium density mode. Also for example, in some embodiments, a second timer may be started when entering high density mode, and when the timer times out, the mode may switch from high density mode to low density mode. The mode may switch from high density to low or medium density based on any combination of criteria without departing from the scope of the present invention.

In some embodiments, pulse power control circuit 220 operates continuously regardless of the current operating mode. For example, during any mode or any transition between modes, if a safety violation is detected, the power level of IR and visible laser light pulses may be reduced to a safe level.

Figure 11:
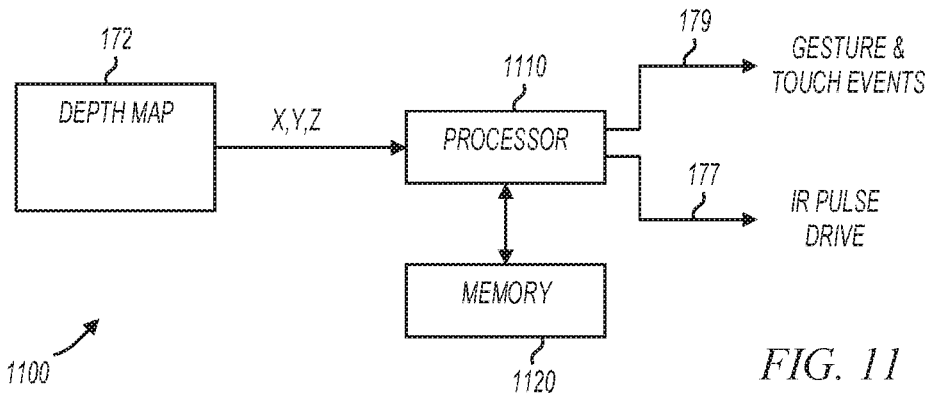
FIG. 11 shows a processor circuit in accordance with various embodiments of the present invention.

FIG. 11 shows a processor circuit in accordance with various embodiments of the present invention. In some embodiments, processor circuit 1100 may be used as IR pulse control and gesture recognition circuit 176 (FIG. 1) as described above. In other embodiments, processor circuit 1100 may be used to implement a portion of IR pulse control and gesture recognition circuit 176. Processor circuit 1100 includes depth map 172, processor 1110, and memory 1120. Memory 1120 represents a non-transitory computer-readable medium that stores instructions. When the instructions are executed by processor 1110, processor 1110 may perform one or more of planarity detection, object recognition, pulse power control, velocity detection, timing, mode control, gesture and/or touch recognition, and IR pulse driver.

Figure 12:
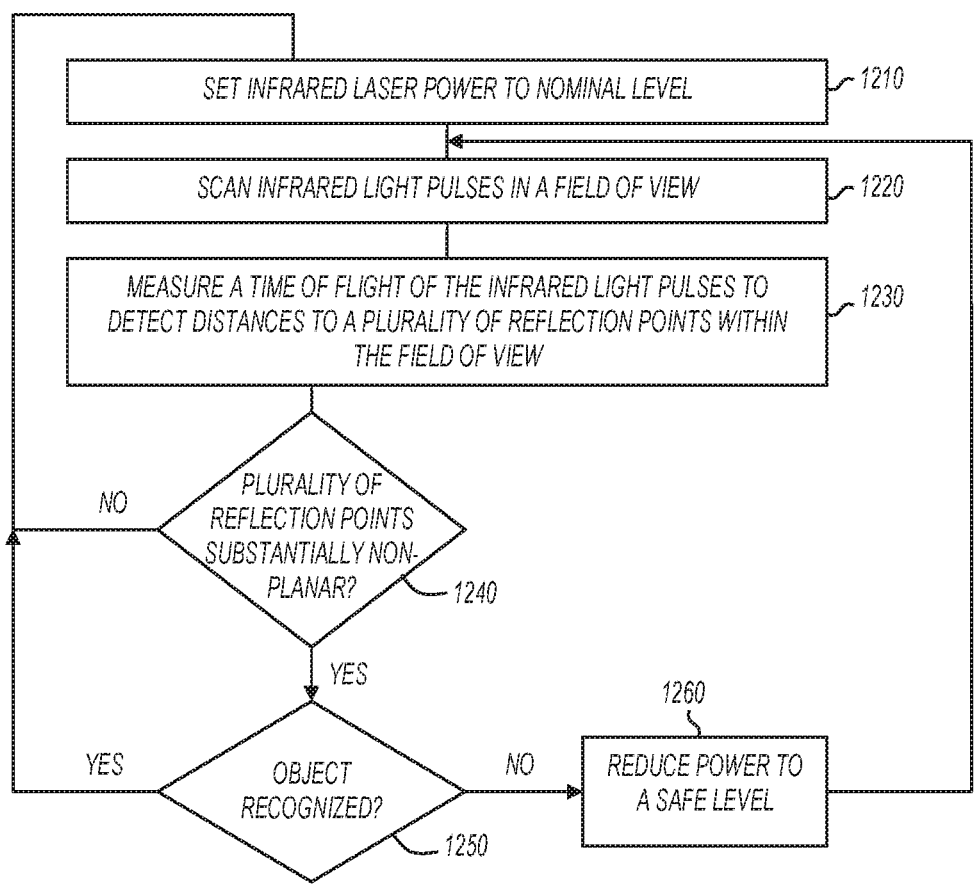
FIGS. 12-14 show flow diagrams of methods in accordance with various embodiments of the present invention.

FIG. 12 shows a flow diagram of methods in accordance with various embodiments of the present invention. In some embodiments, method 1200, or portions thereof, is performed by an IR pulse control and gesture recognition circuit, embodiments of which are shown in previous figures. Further, in some embodiments, method 1200, or portions thereof, is performed by a 3D depth sensing system, embodiments of which are shown in previous figures. In other embodiments, method 1200 is performed by a series of circuits or an electronic system. Method 1200 is not limited by the particular type of apparatus performing the method. The various actions in method 1200 may be performed in the order presented, or may be performed in a different order. Further, in some embodiments, some actions listed in FIG. 12 are omitted from method 1200.

Method 1200 is shown beginning with block 1210. As shown at 1210, infrared laser light power is set to a nominal level, and at 1220, the infrared light pulses are scanned into a field of view. In some embodiments, this corresponds to the IR light pulses created by IR laser light source 164 being reflected off scanning mirror 116 and following raster scan 126 in field of view 130. In some embodiments, the IR light pulses are scanned in one of a low, medium, or high density mode as described above.

At 1230, a TOF of the first IR pulses is measured as the pulses are reflected off the projection surface and any objects in the field of view to detect distances to a plurality of reflection points within the field of view. For example, referring back to FIG. 1, the TOF of IR pulses reflected off of projection surface 128 are measured to determine a distance to the projection surface, and the TOF of IR pulses reflected off of object 130 are measured to determine distances to points on the object.

At 1240, planarity detection is performed. If the plurality of reflection points are found to be substantially planar, then processing continues by scanning the IR pulses, measuring TOF, and planarity detection. If the plurality of reflection points are found to be substantially non-planar, then object recognition is performed at 1250. If the object is recognized, processing continues as before. For example, in an interactive tabletop embodiment, if the object is recognized as a human hand then processing continues as before. If the object is not recognized, then power is reduced to a safe level at 1260, and power is not restored until either the non-planarity is removed, or the object is recognized.

The actions of method 1200 detect and react to safety violations by reducing laser power. Method 1200 may operate in parallel with any other methods of the present invention. For example, if while performing gesture recognition or touch event recognition, method 1200 determines that an unrecognized object is in the field of view, power may be reduced to a safe level.

Figure 13:
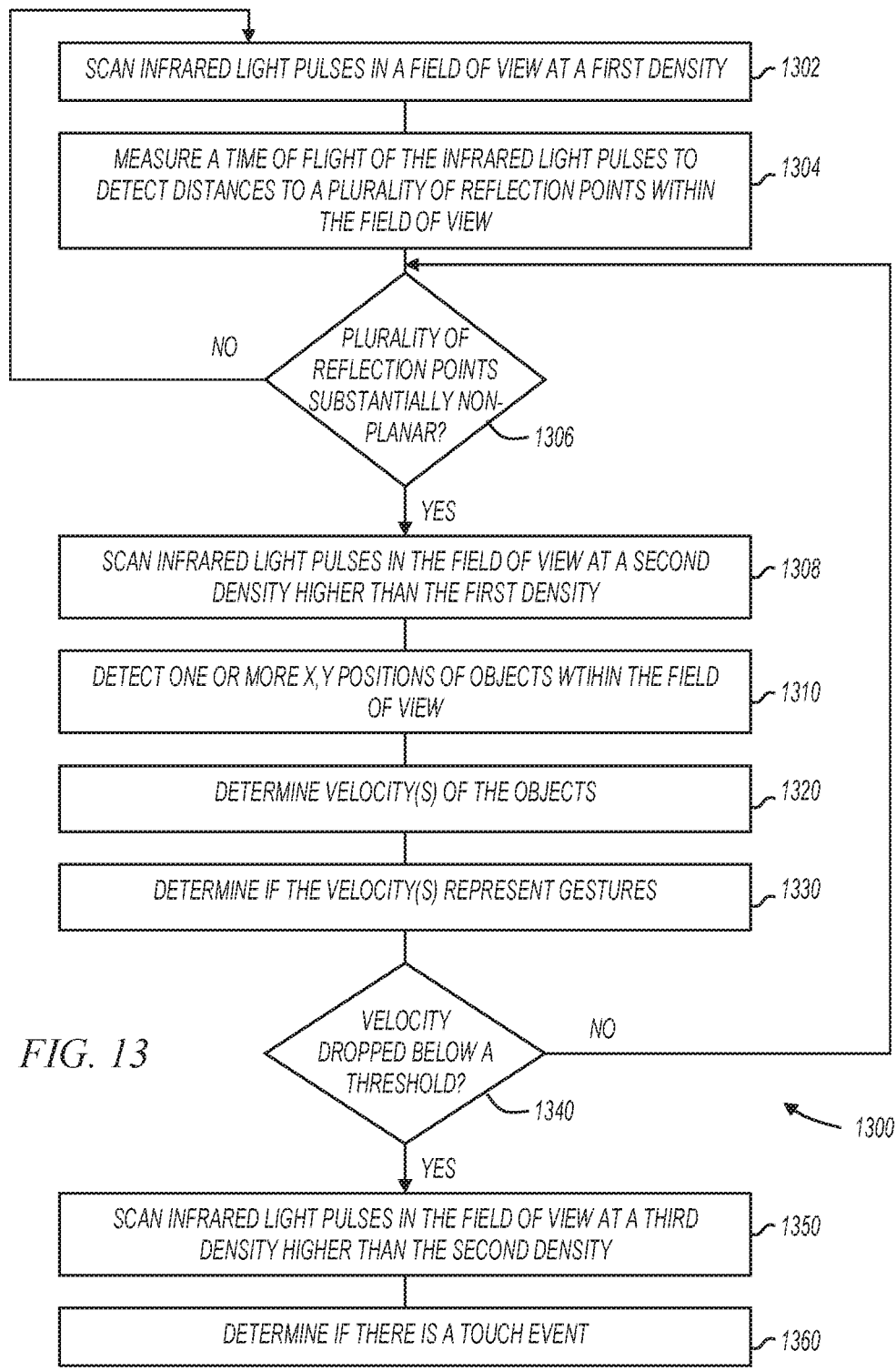

FIG. 13 shows a flow diagram of methods in accordance with various embodiments of the present invention. In some embodiments, method 1300, or portions thereof, is performed by an IR pulse control and gesture recognition circuit, embodiments of which are shown in previous figures. Further, in some embodiments, method 1300, or portions thereof, is performed by a 3D depth sensing system, embodiments of which are shown in previous figures. In other embodiments, method 1300 is performed by a series of circuits or an electronic system. Method 1300 is not limited by the particular type of apparatus performing the method. The various actions in method 1300 may be performed in the order presented, or may be performed in a different order. Further, in some embodiments, some actions listed in FIG. 13 are omitted from method 1300.

Method 1300 is shown beginning with block 1302. As shown at 1302, IR light pulses are scanned in a field of view at a first density. In some embodiments, this corresponds to the IR light pulses shown in FIG. 3 being reflected off scanning mirror 116 and following raster scan 126 in field of view 130.

At 1304, a TOF of the IR pulses is measured as the pulses are reflected off the projection surface and any objects in the field of view to detect distances to a plurality of reflection points within the field of view. For example, referring back to FIG. 1, the TOF of IR pulses reflected off of projection surface 128 are measured to determine a distance to the projection surface, and the TOF of IR pulses reflected off of object 130 are measured to determine distances to points on the object.

At 1306, planarity detection is performed. If the plurality of reflection points are found to be substantially planar, then processing continues by scanning the IR pulses, measuring TOF, and planarity detection. If the plurality of reflection points are found to be substantially non-planar, then the operating mode is changed to a medium density mode in which the IR pulses are scanned at a second density which is higher than the first density at 1308. An example of the second density is shown in FIG. 5.

At 1310, one or more x,y positions of objects with the field of view are detected. For example, a centroid of an object may be computed, or the location of one or more fingertips of a human hand may be determined.

At 1320, the velocity of the one or more x,y positions is determined. For example, if the x,y position corresponds to the centroid of a human hand, the velocity represents the speed and direction that a human hand is moving within the field of view. Also for example, if the x,y position corresponds to the tip of a finger on a human hand, the velocity represents the speed and direction that the fingertip is moving within the field of view.

At 1330, gesture recognition is performed by determining if the velocity(s) represent gestures. In some embodiments, this corresponds to the operation of gesture and touch recognition circuit 270 (FIG. 2) while operating in medium density mode.

At 1340, the velocity is checked to determine if the mode should be switched to low density mode or high density mode. If the velocity has not dropped below a threshold, processing continues with the low density mode at 1302, and if an object is still present, the mode will quickly change back to medium density mode to detect any further gestures. If the velocity has dropped below a threshold, method 1300 transitions to a high density mode to attempt to detect touch events. For example, at 1350, IR pulses are scanned at a third density that is higher than the second density, and at 1360, touch event detection takes place.

In some embodiments, a touch event is detected when a difference between an x,y position on an object in the field of view and a projection surface is determined to be less than a threshold (e.g., a few millimeters). When this distance is very small, the x,y point on the object can be considered as touching or nearly touching the projection surface.

Method 1300 may transition from the high density mode back to the low or medium density modes based on any combination of criteria. For example, a transition may take place after a timer expires, after a touch event has taken place, or after the non-planar condition is removed.

At any point in method 1300, visible laser light pulses may be created and scanned in the field of view to create an image. In some embodiments, the actions of method 1300 occur simultaneously with generation and scanning of visible light pulses to create an image. For example, a scanning display system may project images or video at the same time that the scanning display system is acquiring TOF data, switching modes, and performing gesture and/or touch event recognition.

Figure 14:
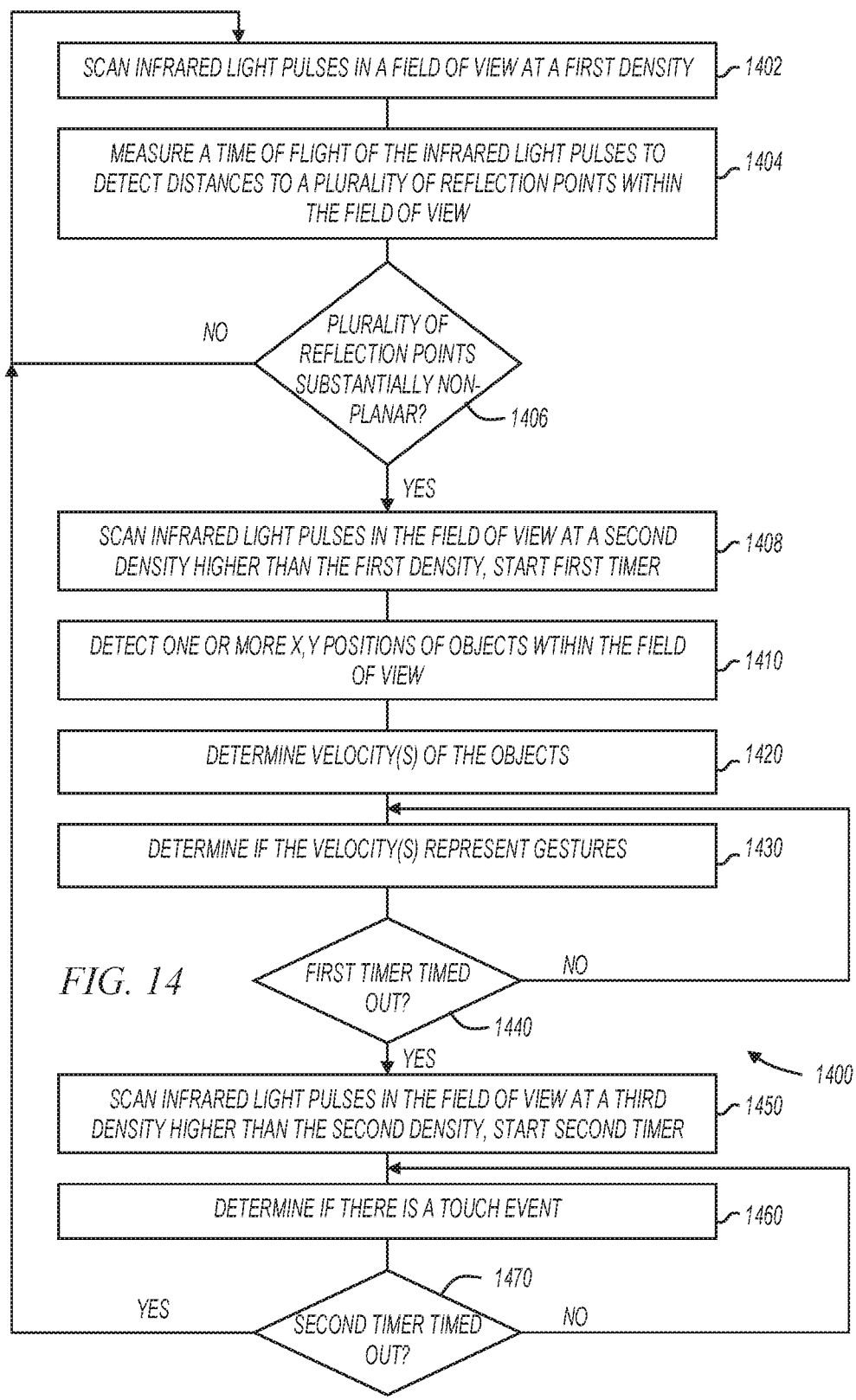

FIG. 14 shows a flow diagram of methods in accordance with various embodiments of the present invention. In some embodiments, method 1400, or portions thereof, is performed by an IR pulse control and gesture recognition circuit, embodiments of which are shown in previous figures. Further, in some embodiments, method 1400, or portions thereof, is performed by a 3D depth sensing system, embodiments of which are shown in previous figures. In other embodiments, method 1400 is performed by a series of circuits or an electronic system. Method 1400 is not limited by the particular type of apparatus performing the method. The various actions in method 1400 may be performed in the order presented, or may be performed in a different order. Further, in some embodiments, some actions listed in FIG. 14 are omitted from method 1400.

Method 1400 is shown beginning with block 1402. As shown at 1402, IR light pulses are scanned in a field of view at a first density. In some embodiments, this corresponds to the IR light pulses shown in FIG. 3 being reflected off scanning mirror 116 and following raster scan 126 in field of view 130.

At 1404, a TOF of the IR pulses is measured as the pulses are reflected off the projection surface and any objects in the field of view to detect distances to a plurality of reflection points within the field of view. For example, referring back to FIG. 1, the TOF of IR pulses reflected off of projection surface 128 are measured to determine a distance to the projection surface, and the TOF of IR pulses reflected off of object 130 are measured to determine distances to points on the object.

At 1406, planarity detection is performed. If the plurality of reflection points are found to be substantially planar, then processing continues by scanning the IR pulses, measuring TOF, and planarity detection. If the plurality of reflection points are found to be substantially non-planar, then the operating mode is changed to a medium density mode in which the IR pulses are scanned at a second density which is higher than the first density at 1408. An example of the second density is shown in FIG. 5. At 1408, a first timer is started.

At 1410, one or more x,y positions of objects with the field of view are detected. For example, a centroid of an object may be computed, or the location of one or more fingertips of a human hand may be determined.

At 1420, the velocity of the one or more x,y positions is determined. For example, if the x,y position corresponds to the centroid of a human hand, the velocity represents the speed and direction that a human hand is moving within the field of view. Also for example, if the x,y position corresponds to the tip of a finger on a human hand, the velocity represents the speed and direction that the fingertip is moving within the field of view.

At 1430, gesture recognition is performed by determining if the velocity(s) represent gestures. In some embodiments, this corresponds to the operation of gesture and touch recognition circuit 270 (FIG. 2) while operating in medium density mode.

At 1440, the first timer is checked to determine if the mode should be switched to high density mode. If the first timer has not timed out, processing continues with the medium density mode at 1430. If the first timer has timed out, method 1400 transitions to a high density mode to attempt to detect touch events. For example, at 1450, IR pulses are scanned at a third density that is higher than the second density, and a second timer is started. At 1460, touch event detection takes place.

In some embodiments, a touch event is detected when a difference between an x,y position on an object in the field of view and a projection surface is determined to be less than a threshold (e.g., a few millimeters). When this distance is very small, the x,y point on the object can be considered as touching or nearly touching the projection surface.

At 1470, method 1400 transitions from the high density mode back to the low density mode if the second timer has timed out. If the second timer has not timed out, processing continues with the high density mode at 1460.

At any point in method 1400, visible laser light pulses may be created and scanned in the field of view to create an image. In some embodiments, the actions of method 1400 occur simultaneously with generation and scanning of visible light pulses to create an image. For example, a scanning display system may project images or video at the same time that the scanning display system is acquiring TOF data, switching modes, and performing gesture and/or touch event recognition.

Figure 15:
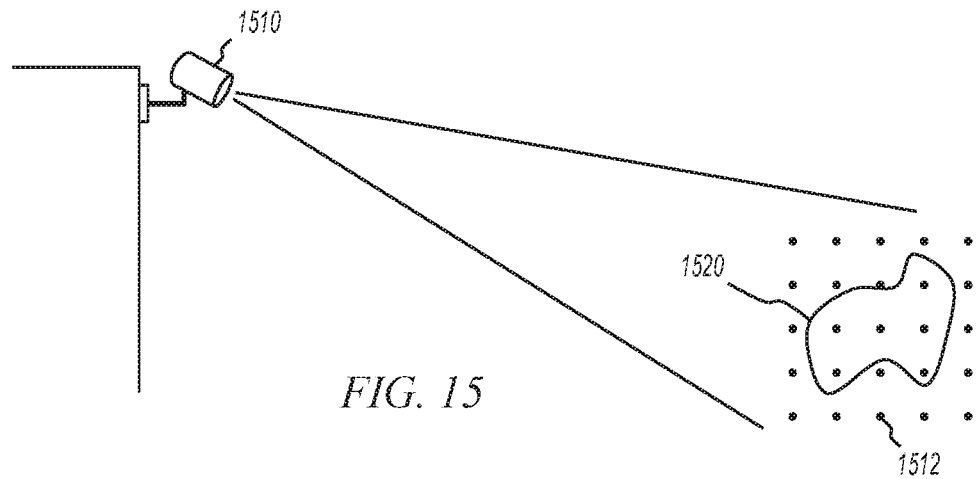
FIGS. 15-17 show smart pulsing used for object identification in accordance with various embodiments of the present invention.
Figure 16:
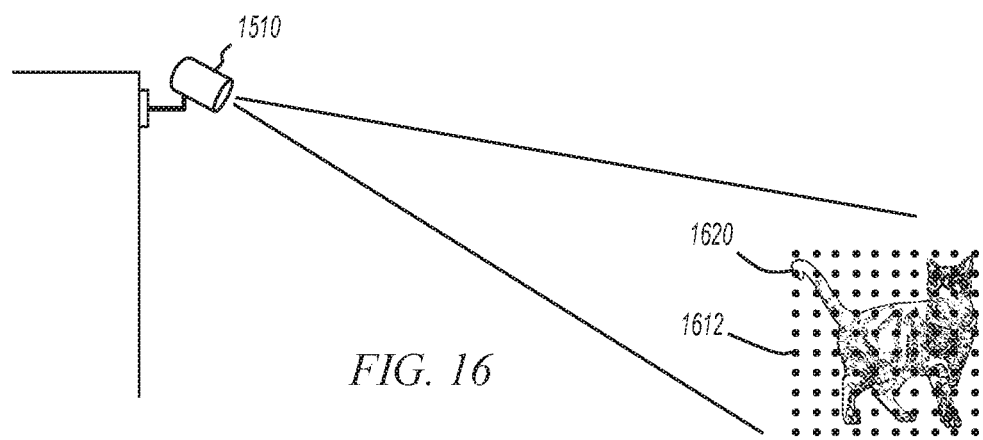
Figure 17:
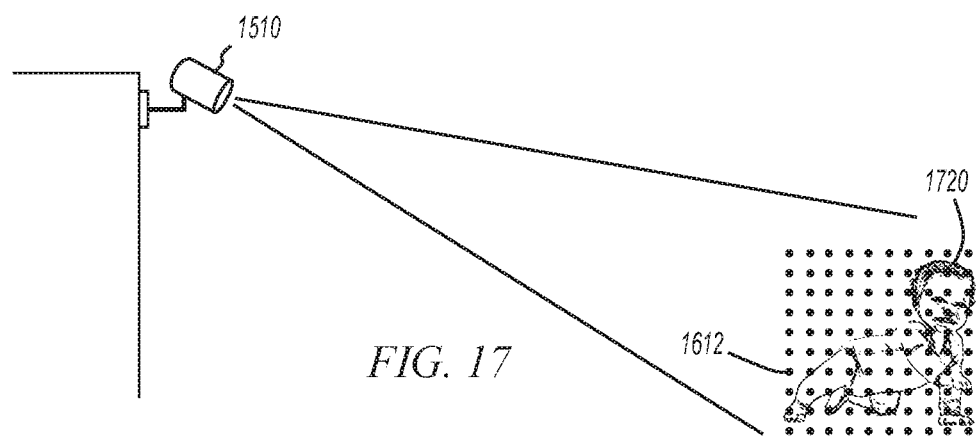

FIGS. 15-17 show smart pulsing used for object identification in accordance with various embodiments of the present invention. FIG. 15 shows a security camera 1510 that includes a scanned beam 3D sensing system. In some embodiments, security camera 1510 may detect and classify objects detected in a field of view and conditionally raise an alarm. For example, in a residential security application, security camera 1510 may detect an object and then classify the object as either human or nonhuman and then conditionally raise an alarm. Additional examples are described below.

In some embodiments, security camera 1510 scans IR pulses 1512 at a first density. In the example of FIG. 15, an object 1520 is detected. Object 1520 may be determined by planarity detection or other means. Because the first density of IR pulses 1512 is comparatively sparse, the object is classified as a small object, potentially a baby or a pet, but the relatively small number of reflection points renders a classification with relatively low confidence. The region around object 1520 is referred to as a region of interest. In some embodiments, the density of IR pulses in the region of interest is increased in an attempt to classify object 1520 with greater confidence.

FIGS. 16 and 17 show security camera 1510 scanning IR pulses 1612 at a second density that is greater than the first density shown in FIG. 15. In the example of FIG. 16, security camera 1510 is able to classify the object as a cat 1620, and in the example of FIG. 17, security camera 1510 is able to classify the object as a baby.

In some embodiments, an alarm may be raised based on the classification of the object. For example, security camera 1510 may be used poolside in a residential setting, and an alarm may be raised when the object is classified as a baby as shown in FIG. 17, whereas an alarm may not be raised when the object is classified as a cat as shown in FIG. 16.

Figure 18:
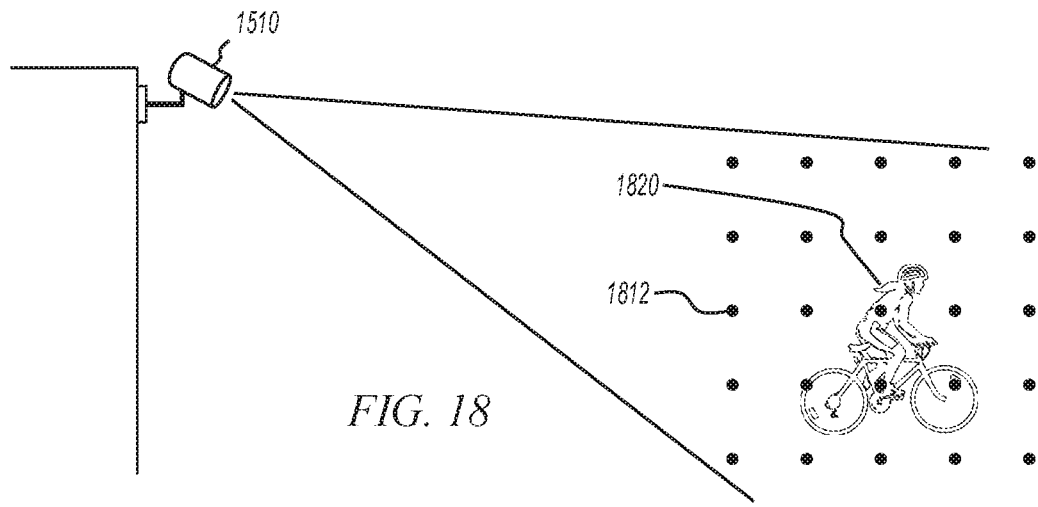
FIGS. 18 and 19 show smart pulsing based on motion in the field of view in accordance with various embodiments of the present invention.
Figure 19:
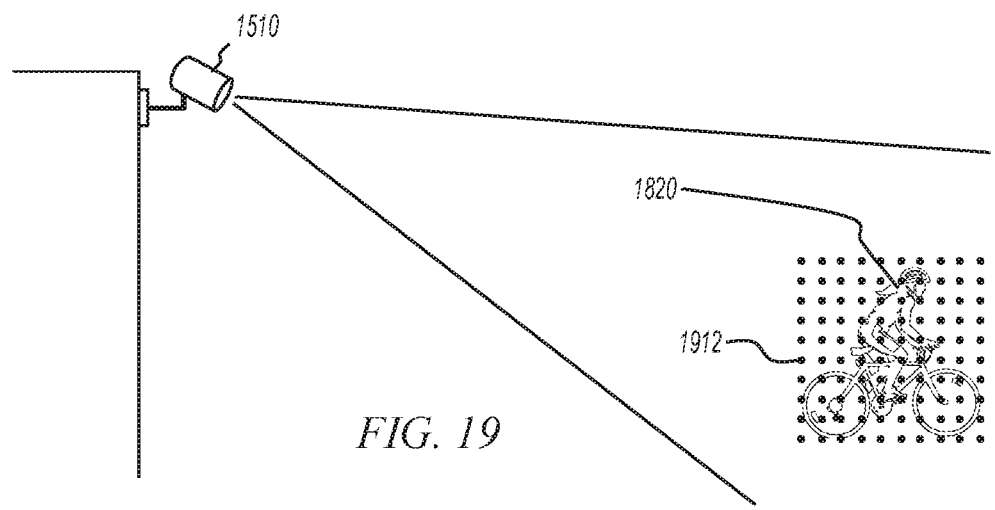

FIGS. 18 and 19 show smart pulsing based on motion in the field of view in accordance with various embodiments of the present invention. FIG. 18 shows a security camera 1510 that includes a scanned beam 3D sensing system. In some embodiments, security camera 1510 may perform an interframe analysis in which times-of-flight of reflection points between subsequent frames are compared to determine regions of interest within the field of view. For example, the interframe analysis may determine the motion delta frame or the interframe motion vectors or use high pass filters to determine the edges of the net motion between the frames. The interframe analysis may be performed using any technique or algorithm. Examples include, but are not limited to, block matching, sliding window algorithms, edge detection, mean square error functions, and the like.

An example is shown in FIG. 18 in which a bicyclist 1820 is moving through the field of view that has reflection points 1812 illuminated by IR pulses. An interframe analysis will result in nonzero motion vectors in the region of interest about bicyclist 1820. The nonzero motion vectors are also referred to as high frequency content.

As shown in FIG. 19, once the bounds of the region of interest is determined, the pulse density is increased in that region in subsequent frames until the high frequency (image content) either drops below or exceeds a certain threshold. If the amount of high frequency content in a difference/delta frame increases over a certain threshold, maximum pulse density may be chosen as opposed to regional. Similarly, if the high frequency content drops below a certain threshold, it might be close to the noise floor that increasing pulse density might not yield valuable information. For example, tracking an insect flying through the field of view with high resolution may not provide meaningful results, whereas tracking a bird with high resolution might provide meaningful results.

Figure 20:
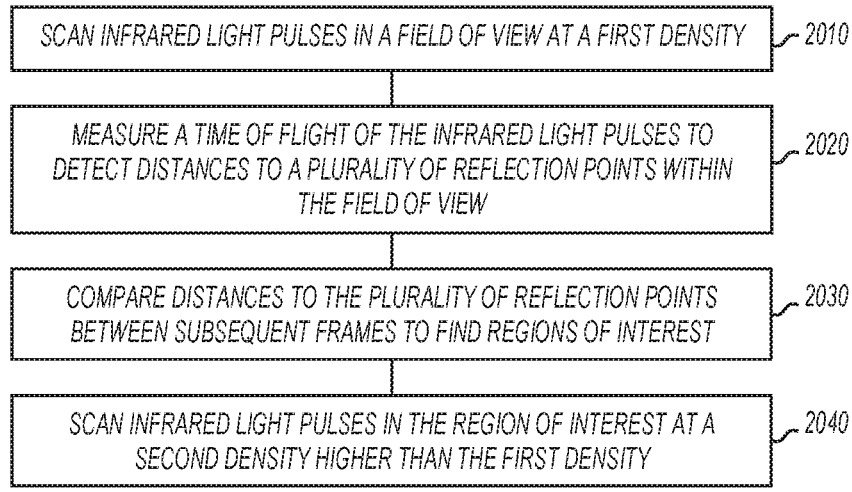
FIGS. 20 and 21 show flow diagrams of methods in accordance with various embodiments of the present invention.

FIG. 20 shows a flow diagram of methods in accordance with various embodiments of the present invention. In some embodiments, method 2000, or portions thereof, is performed by an IR pulse control and gesture recognition circuit, embodiments of which are shown in previous figures. Further, in some embodiments, method 2000, or portions thereof, is performed by a 3D depth sensing system, embodiments of which are shown in previous figures. In other embodiments, method 2000 is performed by a series of circuits or an electronic system. Method 2000 is not limited by the particular type of apparatus performing the method. The various actions in method 2000 may be performed in the order presented, or may be performed in a different order. Further, in some embodiments, some actions listed in FIG. 20 are omitted from method 2000.

Method 2000 is shown beginning with block 2010. As shown at 2010, IR light pulses are scanned in a field of view at a first density. In some embodiments, this corresponds to the IR light pulses shown in FIG. 18 being scanned into a field of view by security camera 1510.

At 2020, a TOF of the IR pulses is measured as the pulses are reflected off any objects in the field of view to detect distances to a plurality of reflection points within the field of view. For example, referring back to FIG. 18, the TOF of IR pulses reflected off of bicyclist 1820 are measured to determine a distance to the corresponding reflection points on the bicyclist.

At 2030, distances to the plurality of reflection points are compared between subsequent frames to find regions of interest. In some embodiments, the actions of 2030 are achieved by performing an interframe analysis to determine whether high frequency content exists. In the example of FIG. 18, the interframe analysis may result in high frequency content in a region of interest around the bicyclist.

At 2040, infrared light pulses are scanned in the field at a second density that is greater than the first density. In some embodiments, this corresponds to increasing pulse density in the entire field of view, and in other embodiments, this corresponds to increasing the pulse density in the region of interest that includes the high frequency content. For example, as shown in FIG. 19, IR pulses 1912 are scanned at a higher density in the region of interest around bicyclist 1820.

In some embodiments, the high frequency content corresponds to a detected object that has a velocity above a threshold. For example, a region of interest may be a region in which an object detected in the field of view has a velocity above a threshold. Also in some embodiments, method 2000 continues to scan at the second density until one or more criteria are met. For example, in some embodiments, method 2000 continues to scan at the second density until the velocity goes below the threshold used to transition from the first density to the second density. Also for example, in some embodiments, method 2000 continues to scan at the second density until the velocity goes below a different threshold.

Figure 21:
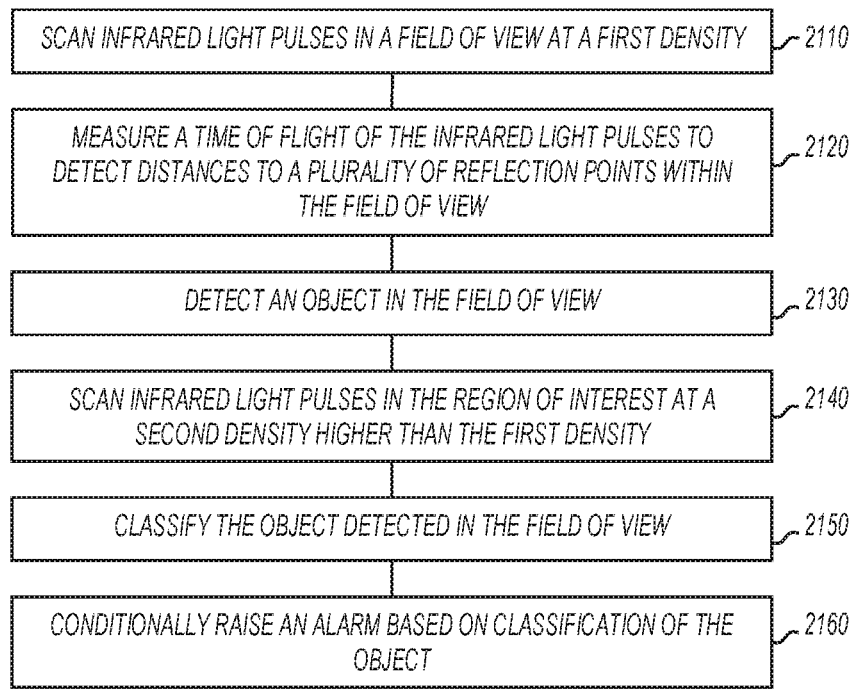

FIG. 21 shows a flow diagram of methods in accordance with various embodiments of the present invention. In some embodiments, method 2100, or portions thereof, is performed by an IR pulse control and gesture recognition circuit, embodiments of which are shown in previous figures. Further, in some embodiments, method 2100, or portions thereof, is performed by a 3D depth sensing system, embodiments of which are shown in previous figures. In other embodiments, method 2100 is performed by a series of circuits or an electronic system. Method 2100 is not limited by the particular type of apparatus performing the method. The various actions in method 2100 may be performed in the order presented, or may be performed in a different order. Further, in some embodiments, some actions listed in FIG. 21 are omitted from method 2100.

Method 2100 is shown beginning with block 2110. As shown at 2110, IR light pulses are scanned in a field of view at a first density. In some embodiments, this corresponds to the IR light pulses shown in FIG. 15 being scanned into a field of view by security camera 1510.

At 2120, a TOF of the IR pulses is measured as the pulses are reflected off any objects in the field of view to detect distances to a plurality of reflection points within the field of view. For example, referring back to FIG. 15, the TOF of IR pulses reflected off of object 1520 are measured to determine a distance to the corresponding reflection points on the object.

At 2130, an object is detected in the field of view. This corresponds to detecting object 1520. At 2140, infrared light pulses are scanned in the field at a second density that is greater than the first density. In some embodiments, this corresponds to increasing pulse density in the entire field of view, and in other embodiments, this corresponds to increasing the pulse density in the region of interest that includes the detected object. For example, as shown in FIGS. 16 and 17, IR pulses 1612 are scanned at a higher density in the region of interest around objects 1620 and 1720.

At 2150, the object in the field of view is classified, and at 2160, an alarm is conditionally raised based on classification of the object. In some embodiments, the object is classified as inanimate, human, or otherwise. For example, in the example of FIG. 16, the object 1620 is classified as a cat, and in the example of FIG. 17, the object 1720 is classified as a baby. An alarm may be conditionally raised based on the application of the apparatus performing method 2100. For example, if a security camera is placed in a chicken coop to protect chickens, an alarm may be raised if the object is classified as a cat, and if a security camera is placed near a pool, an alarm may be raised if the object is classified as a baby. Objects may be classified in any manner, and alarms may be raised based on any classification without departing from the scope of the present invention.

Figure 22:
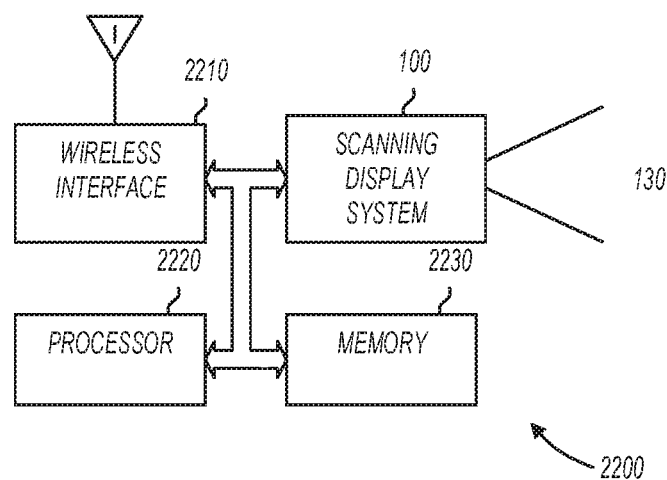
FIG. 22 shows a block diagram of a mobile device in accordance with various embodiments of the present invention.

FIG. 22 shows a block diagram of a mobile device in accordance with various embodiments of the present invention. As shown in FIG. 22, mobile device 2200 includes wireless interface 2210, processor 2220, memory 2230, and scanned beam 3D sensing system 100. Scanned beam 3D sensing system 100 may be any scanning system that includes smart pulsing as described above.

Scanned beam 3D sensing system 100 may include a projector that receives image data from any image source. For example, in some embodiments, scanned beam 3D sensing system 100 includes memory that holds still images. In other embodiments, scanned beam 3D sensing system 100 includes memory that includes video images. In still further embodiments, scanned beam 3D sensing system 100 displays imagery received from external sources such as connectors, wireless interface 2210, a wired interface, or the like.

Wireless interface 2210 may include any wireless transmission and/or reception capabilities. For example, in some embodiments, wireless interface 2210 includes a network interface card (NIC) capable of communicating over a wireless network. Also for example, in some embodiments, wireless interface 2210 may include cellular telephone capabilities. In still further embodiments, wireless interface 2210 may include a global positioning system (GPS) receiver. One skilled in the art will understand that wireless interface 2210 may include any type of wireless communications capability without departing from the scope of the present invention.

Processor 2220 may be any type of processor capable of communicating with the various components in mobile device 2200. For example, processor 2220 may be an embedded processor available from application specific integrated circuit (ASIC) vendors, or may be a commercially available microprocessor. In some embodiments, processor 2220 provides image or video data to scanned beam 3D sensing system 100. The image or video data may be retrieved from wireless interface 2210 or may be derived from data retrieved from wireless interface 2210. For example, through processor 2220, scanned beam 3D sensing system 100 may display images or video received directly from wireless interface 2210. Also for example, processor 2220 may provide overlays to add to images and/or video received from wireless interface 2210, or may alter stored imagery based on data received from wireless interface 2210 (e.g., modifying a map display in GPS embodiments in which wireless interface 2210 provides location coordinates).

Figure 23:
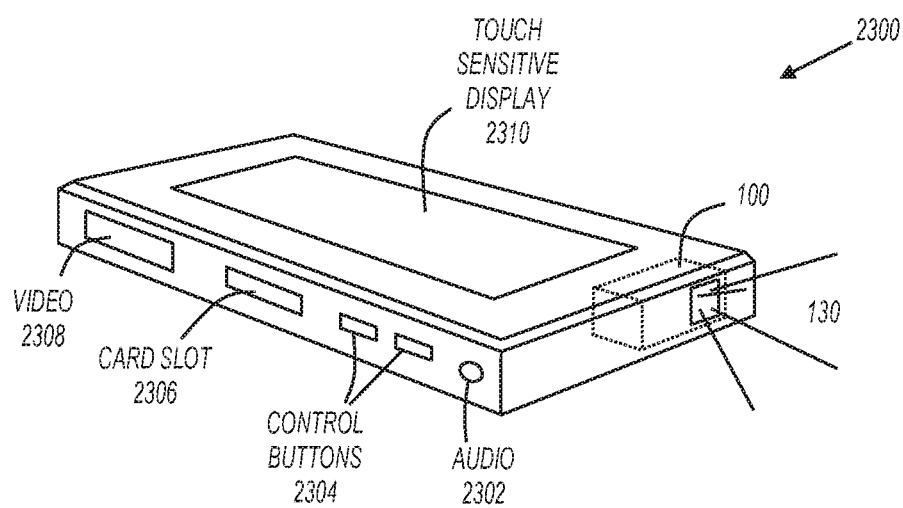
FIG. 23 shows a mobile device in accordance with various embodiments of the present invention.

FIG. 23 shows a mobile device in accordance with various embodiments of the present invention. Mobile device 2300 may be a hand held scanned beam 3D sensing system with or without communications ability. For example, in some embodiments, mobile device 2300 may be a scanned beam 3D sensing system with an embedded scanning display system with little or no other capabilities. Also for example, in some embodiments, mobile device 2300 may be a device usable for communications, including for example, a cellular phone, a smart phone, a tablet computing device, a global positioning system (GPS) receiver, or the like. Further, mobile device 2300 may be connected to a larger network via a wireless (e.g., cellular), or this device can accept and/or transmit data messages or video content via an unregulated spectrum (e.g., WiFi) connection.

Mobile device 2300 includes scanned beam 3D sensing system 100, touch sensitive display 2310, audio port 2302, control buttons 2304, card slot 2306, and audio/video (A/V) port 2308. None of these elements are essential. For example, mobile device 2300 may only include scanned beam 3D sensing system 100 without any of touch sensitive display 2310, audio port 2302, control buttons 2304, card slot 2306, or A/V port 2308. Some embodiments include a subset of these elements. For example, an accessory projector may include scanned beam 3D sensing system with an embedded projector 100, control buttons 2304 and A/V port 2308. A smartphone embodiment may combine touch sensitive display device 2310 and system 100.

Touch sensitive display 2310 may be any type of display. For example, in some embodiments, touch sensitive display 2310 includes a liquid crystal display (LCD) screen. In some embodiments, display 2310 is not touch sensitive. Display 2310 may or may not always display the image projected by system 100. For example, an accessory product may always display the projected image on display 2310, whereas a mobile phone embodiment may project a video while displaying different content on display 2310. Some embodiments may include a keypad in addition to touch sensitive display 2310.

A/V port 2308 accepts and/or transmits video and/or audio signals. For example, A/V port 2308 may be a digital port, such as a high definition multimedia interface (HDMI) interface that accepts a cable suitable to carry digital audio and video data. Further, A/V port 2308 may include RCA jacks to accept or transmit composite inputs. Still further, A/V port 2308 may include a VGA connector to accept or transmit analog video signals. In some embodiments, mobile device 2300 may be tethered to an external signal source through A/V port 2308, and mobile device 2300 may project content accepted through A/V port 2308. In other embodiments, mobile device 2300 may be an originator of content, and A/V port 2308 is used to transmit content to a different device.

Audio port 2302 provides audio signals. For example, in some embodiments, mobile device 2300 is a media recorder that can record and play audio and video. In these embodiments, the video may be projected by system 100 and the audio may be output at audio port 2302.

Mobile device 2300 also includes card slot 2306. In some embodiments, a memory card inserted in card slot 2306 may provide a source for audio to be output at audio port 2302 and/or video data to be projected by scanning display system 100. Card slot 2306 may receive any type of solid state memory device, including for example secure digital (SD) memory cards.

Figure 24:
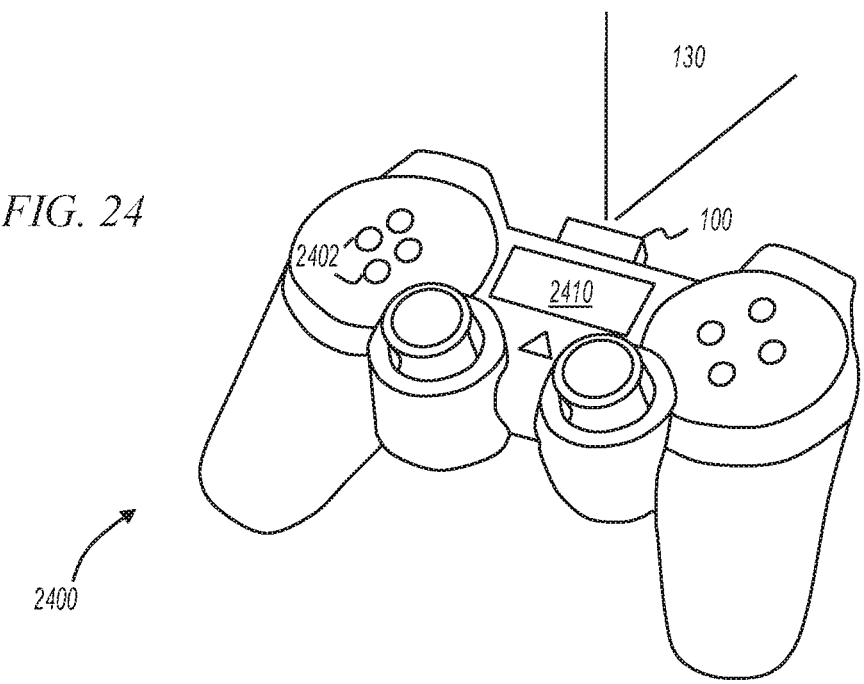
FIG. 24 shows a gaming apparatus in accordance with various embodiments of the present invention.

FIG. 24 shows a gaming apparatus in accordance with various embodiments of the present invention. Gaming apparatus 2400 includes buttons 2402, display 2410, and system 100. In some embodiments, gaming apparatus 2400 is a standalone apparatus that does not need a larger console for a user to play a game. For example, a user may play a game while watching display 2410 and/or the projected content at 130. In other embodiments, gaming apparatus 2400 operates as a controller for a larger gaming console. In these embodiments, a user may watch a larger screen tethered to the console in combination with watching display 2410 and/or projected content at 130. In some embodiments, a user may interact with gaming apparatus 2400 as system 100 transitions between low, medium, and high density modes as described above.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method comprising:
   producing infrared light pulses at a first rate;
   scanning the infrared light pulses in two dimensions in a field of view to illuminate a first plurality of reflection points within the field of view at a first spatial resolution;
   measuring a time-of-flight of the infrared light pulses to detect distances to the first plurality of reflection points within the field of view;
   determining that the first plurality of reflection points are substantially non-planar;

producing the infrared light pulses at a second rate higher than the first rate and scanning the infrared light pulses in the field of view to illuminate a second plurality of reflection points within the field of view at a second spatial resolution higher than the first spatial resolution, measuring a time-of-flight of the infrared light pulses to detect distances to the second plurality of reflection points within the field of view, detecting an x,y position of an object in the field of view, and determining a velocity of the object;

determining if the velocity represents a gesture; and determining that the second plurality of reflection points are substantially non-planar and that the velocity is below a threshold, scanning infrared light pulses in the field of view at a third spatial resolution higher than the second spatial resolution, and determining if the distance to the object represents a touch event.

2. The method of claim 1 wherein the first spatial resolution comprises infrared pulses only in a perimeter of the field of view.

3. The method of claim 2 wherein the second spatial resolution comprises infrared pulses in the perimeter and inside the perimeter.

4. The method of claim 3 wherein the third spatial resolution comprises infrared pulses in the perimeter and in a subset of the field of view inside the perimeter.

5. The method of claim 1 further comprising reducing power of the infrared pulses when non-planarity is detected until an object is recognized in the field of view.

6. The method of claim 1 further comprising determining that the second plurality of reflection points are substantially planar and returning to scanning infrared light pulses in the field of view at the first spatial resolution.

7. The method of claim 1 further comprising:
creating visible laser light pulses; and
scanning the visible laser light pulses in the field of view to create an image.

8. A method comprising:
producing infrared light pulses at a first rate;
scanning the infrared light pulses in two dimensions in a field of view to illuminate a first plurality of reflection points within the field of view at a first spatial resolution;
measuring a time-of-flight of the infrared light pulses to detect distances to the first plurality of reflection points within the field of view;
determining that the plurality of reflection points are substantially non-planar;
producing the infrared light pulses at a second rate higher than the first rate and scanning the infrared light pulses in the field of view to illuminate a second plurality of reflection points within the field of view at a second spatial resolution higher than the first spatial resolution, starting a first timer, detecting an x,y position of an object in the field of view, and determining a velocity of the object;
when the first timer times out and the velocity is below a threshold, determining that the second plurality of reflection points are substantially non-planar, and scanning infrared light pulses in the field of view at a third spatial resolution higher than the second spatial resolution, and starting a second timer;
when the second timer times out, determining that the second plurality of reflection points are not substantially non-planar, returning to scanning the infrared light pulses in the field of view at the first spatial resolution.

9. The method of claim 8 further comprising determining if the velocity represents a gesture while the first timer is running.

10. The method of claim 8 further comprising determining if the distance to the object represents a touch event while the second timer is running.

11. The method of claim 8 further comprising determining if a touch event is represented by a distance to any of a plurality of points on the object while the second timer is running.

12. The method of claim 8 further comprising:
creating visible laser light pulses; and
scanning the visible laser light pulses in the field of view to create an image.

13. The method of claim 8 further comprising:
performing object recognition on an object causing the second plurality of reflection points to be substantially non-planar; and
reducing power to a safe level if the object is not recognized as a safe object.

14. The method of claim 13 wherein the safe object is a human hand.

15. The method of claim 8 wherein scanning infrared light pulses in a field of view at a first spatial resolution comprises scanning infrared light pulses in a perimeter of the field of view.

16. The method of claim 8 wherein scanning infrared light pulses in a field of view at a first spatial resolution comprises scanning infrared light pulses during a retrace of frame.

17. A scanning display system comprising:
at least one visible laser light source;
at least one infrared laser light source;
a scanning mirror to reflect and scan modulated laser light pulses received from the at least one visible laser light source and at least one infrared laser light source into a field of view;
a time-of-flight detection circuit to detect a time-of-flight of reflected infrared laser light pulses;
a position detection circuit to correlate timing of reflected infrared laser light pulses with movement of the scanning mirror to determine an x, y position of a reflector in the field of view; and
a control circuit to drive the at least one infrared laser light source with pulses at a first rate to illuminate a first plurality of reflection points at a first spatial resolution in the field of view until the time-of-flight detection circuit determines that an object has entered the field of view,
to drive the at least one infrared laser light source with pulses at a second rate higher than the first rate to illuminate a second plurality of reflection points at a second spatial resolution higher than the first spatial resolution to detect gestures made by the object, and
to drive the at least one infrared laser light source with pulses at a third rate higher than the second rate to detect touch events made by the object,
wherein the control circuit tracks a velocity of the object and the control circuit switches from driving the at least one infrared laser light source with pulses at a second rate to driving the at least one infrared laser light source with pulses at a third rate higher than the second rate if the velocity drops below a threshold.

18. The scanning display system of claim 17 wherein the control circuit reduces emitted light power to a safe level when the object is not recognized as a safe object.

19. The scanning display system of claim 17 wherein the control circuit tracks a velocity of the object and the control circuit continues to drive the at least one infrared laser light source with pulses at a second rate if the velocity remains above a threshold.

* * * * *